United States Patent [19]

Motersole et al.

[11] Patent Number: 4,740,889
[45] Date of Patent: Apr. 26, 1988

[54] CACHE DISABLE FOR A DATA PROCESSOR

[75] Inventors: David S. Motersole, Austin, Tex.; Jay A. Hartvigsen, Tempe, Ariz.; John Zolnowsky, Menlo Park, Calif.

[73] Assignee: Motorola, Inc., Schaumburg, Ill.

[21] Appl. No.: 885,801

[22] Filed: Jul. 14, 1986

Related U.S. Application Data

[63] Continuation of Ser. No. 625,342, Jun. 26, 1984, abandoned.

[51] Int. Cl.⁴ .......................................... G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,075,686 | 2/1978 | Calle et al. | 364/200 |
| 4,153,933 | 5/1979 | Blume, Jr. et al. | 364/200 |
| 4,190,885 | 2/1980 | Joyce et al. | 364/200 |
| 4,219,883 | 8/1980 | Kobayashi et al. | 365/189 |
| 4,264,953 | 4/1981 | Douglas et al. | 364/200 |
| 4,357,656 | 11/1982 | Saltz et al. | 364/200 |
| 4,464,717 | 8/1984 | Kelley et al. | 364/200 |
| 4,562,536 | 12/1985 | Keeley et al. | 364/200 |

Primary Examiner—Eddie P. Chan
Attorney, Agent, or Firm—John A. Fisher; Jeffrey Van Myers

[57] ABSTRACT

A data processor is adapted for operation with a memory containing a plurality of items of operating information for the data processor. In addition a cache stores a selected number of all of the items of the operating information. When the cache provides an item of operating information, the memory is not requested to provide the item so that a user of the data processor cannot detect the request for the item. A disable circuit is provided to prevent the cache from providing the item when a signal external to the data processor is provided. Consequently, a user, with the external signal, can cause the data processor to make all of its requests for items of operating information to the memory where these requests can be detected.

1 Claim, 5 Drawing Sheets

CACHE DISABLE FOR A DATA PROCESSOR

This is a continuation of application Ser. No. 625,342, filed 6-26-84, now abandoned.

FIELD OF THE INVENTION

The present invention relates to data processors which have a cache memory, and more particularly, to data processors which can disable such a cache memory.

BACKGROUND OF THE INVENTION

Data processing systems frequently have a cache memory for improving performance. The cache memory is typically used to provide very quick access to instructions which are the ones being most frequently used.

The cache memory is typically in close proximity to a processing unit of the data processing system and has a relatively fast access time. The instructions which are being frequently used are advantageously stored there to improve overall system speed. These same instructions stored in the cache memory are also available elsewhere in the system and accessible via a common bus. The common bus is typically available to a user. When an instruction is fetched in the cache memory, it is desirable, although not necessary, to prevent this address which accessed the instruction in the cache memory from also reaching the common bus. This is desirable because system speed can be increased by not wasting time on the common bus with a redundant address. Consequently, data processors have been developed which prevent an address which accesses a location in cache memory from reaching the common bus. This has the effect of preventing a user from being able to discern an instruction which has been accessed in cache memory.

Being able to discern the sequence of instructions is necessary for a user who is experimenting with a program in microcode whether such experimentation is pursuant to creating or altering a program. Consequently, it has been found useful to provide the microcode programmer with the ability to force all of the instructions onto the common bus where they can be read. Such ability has been available only with software instructions, i.e., in order to achieve this result it has been necessary to place such a command into the program itself. In order to change the timing of such features, the program must be changed. Also because the timing of the feature is in the program, it is not easily tied directly to bus cycles or some other real time measurement.

SUMMARY OF THE INVENTION

An object of the present invention is to provide a data processor with an improved cache memory disable.

Another object of the invention is to provide a data processor with improved cache disable flexibility.

Yet another object of the invention is to provide a data processor with a cache memory which is disabled via a single external signal line.

These and other objects are achieved in a data processor adapted for operation with a memory containing a plurality of items of operating information for said data processor. The data processor has an information processing circuit, a memory access circuit, a cache storage circuit, a cache control circuit, and a disable circuit.

The information processing circuit performs operations in accordance with items of operating information provided thereto, at least one of said operations including providing an information request signal requesting one of said items of operating information.

The memory access circuit, in response to said information request signal, retrieves said one item of said operating information from said memory, and then provides said one item of said operating information to said information processing circuit.

The cache storage circuit stores a selected number of all of said items of said operating information provided by said memory access circuit to said information processing circuit. If said one item of said operating information is stored in said cache storage circuit when said one item of operating information is requested by said information processing circuit, the cache storage circuit provides said one item of said operating information to said information storage circuit in response to said information request signal.

The cache control circuit, in response to said cache storage means providing said one item of said operating information to said information processing means, prevents said memory access means from responding to said information request signal.

The cache disable circuit, in response to a cache disable signal originating external to said data processor, prevents said cache storage means from providing said one item of information to said information processing means in response to said information request signal.

DESCRIPTION OF THE INVENTION

Figure 1:
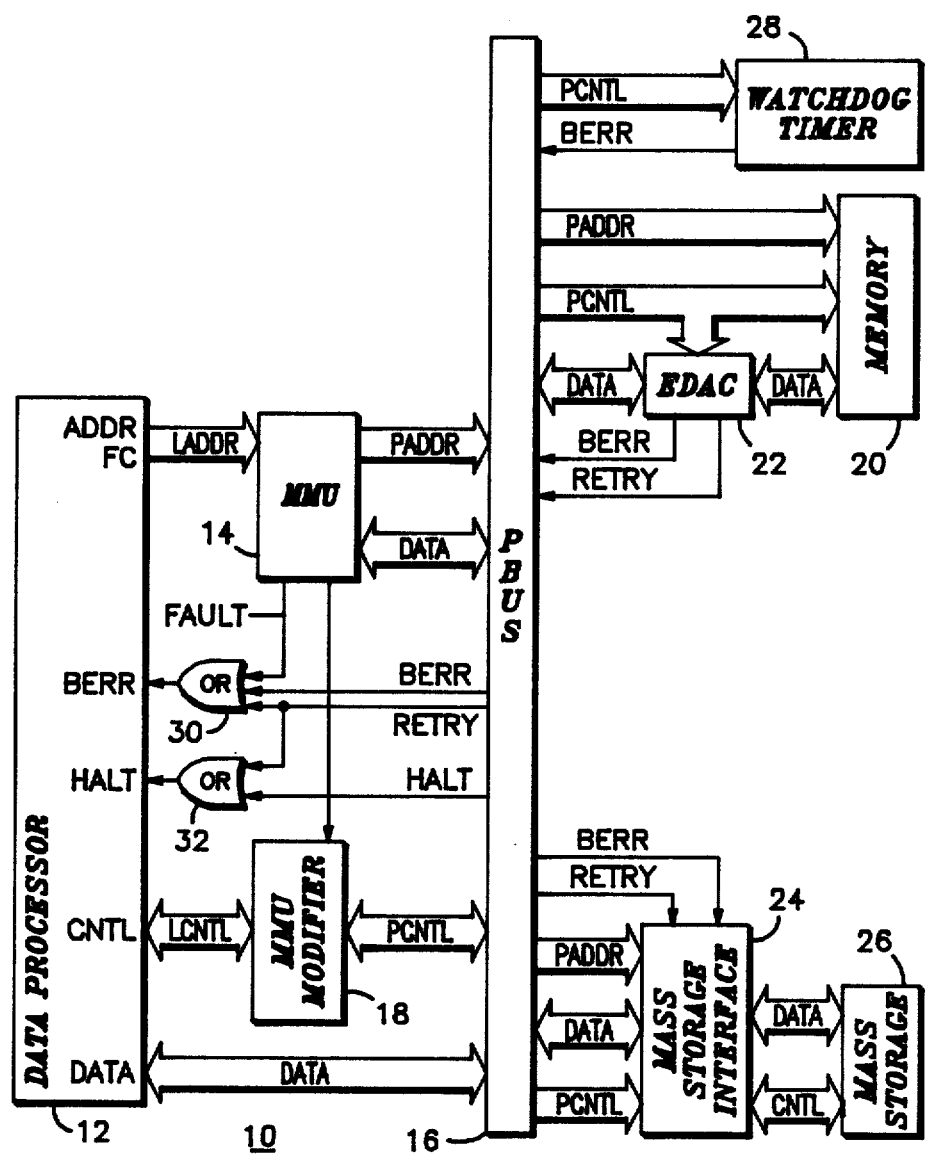
FIG. 1 is a block diagram of a data processing system for implementing the invention.

Shown in FIG. 1 is a data processing system 10 wherein logical addresses (LADDR) issued by a data processor (DP) 12 are mapped by a memory management unit (MMU) 14 to a corresponding physical address (PADDR) for output on a physical bus (PBUS) 16. Simultaneously, the various logical access control signals (LCNTL) provided by DP 12 to control the access are converted to appropriately timed physical access control signals (PCNTL) by a modifier unit 18 under the control of MMU 14. DP 12 is an example of a data processor which is capable of implementing the present invention relating to a cache memory and the disabling thereof.

In response to a particular range of physical addresses (PADDR), memory 20 will cooperate with an error detection and correction circuit (EDAC) 22 to exchange data (DATA) with DP 12 in synchronization with the physical access control signals (PCNTL) on PBUS 16. Upon detecting an error in the data, EDAC 22 will either signal a bus error (BERR) or request DP 12 to retry (RETRY) the exchange, depending upon the type of error.

In response to a different physical address, mass storage interface 24 will cooperate with DP 12 to transfer data to or from mass storage 26. If an error occurs during the transfer, interface 24 may signal a bus error (BERR) or, if appropriate, request a retry (RETRY).

In the event that the MMU 14 is unable to map a particular logic address (LADDR) into a corresponding physical address (PADDR), the MMU 14 will signal an access fault (FAULT). As a check for MMU 14, a watchdog timer 28 may be provided to signal a bus error (BERR) if no physical device has responded to a physical address (PADDR) within a suitable time period relative to the physical access control signals (PCNTL).

If, during a data access bus cycle, a RETRY is requested, OR gates 30 and 32 will respectively activate the BERR and HALT inputs of DP 12. In response to the simultaneous activation of both the BERR and HALT inputs thereof during a DP-controlled bus cycle, DP 12 will abort the current bus cycle and, upon the termination of the RETRY signal, retry the cycle.

If desired, operation of DP 12 may be externally controlled by judicious use of a HALT signal. In response to the activation of only the HALT input thereof via OR gate 32, DP 12 will halt at the end of the current bus cycle, and will resume operation only upon the termination of the HALT signal.

In response to the activation of only the BERR input thereof during a processor-controlled bus cycle, DP 12 will abort the current bus cycle, internally save the contents of the status register, enter the supervisor state, turn off the trace state if on, and generate a bus error vector number. DP 12 will then stack into a supervisor stack area in memory 20 a block of information which reflects the current internal context of the processor, and then use the vector number to branch to an error handling portion of the supervisor program.

Up to this point, the operation of DP 12 is identical to the operation of Motorola's MC68000 microprocessor. However, DP 12 differs from the MC68000 in the amount of information which is stacked in response to the assertion of BERR. The information stacked by the MC68000 consists of: the saved status register, the current contents of the program counter, the contents of the instruction register which is usually the first word of the currently executing instruction, the logical address which was being accessed by the aborted bus cycle, and the characteristics of the aborted bus cycle, i.e. read/-write, instruction/data and function code. In addition to the above information, DP 12 is constructed to stack much more information about the internal machine state. If the exception handler is successful in resolving the error, the last instruction thereof will return control of DP 12 to the aborted program. During the execution of this instruction, the additional stacked information is retrieved and loaded into the appropriate portions of DP 12 to restore the state which existed at the time the bus error occurred.

Figure 2:
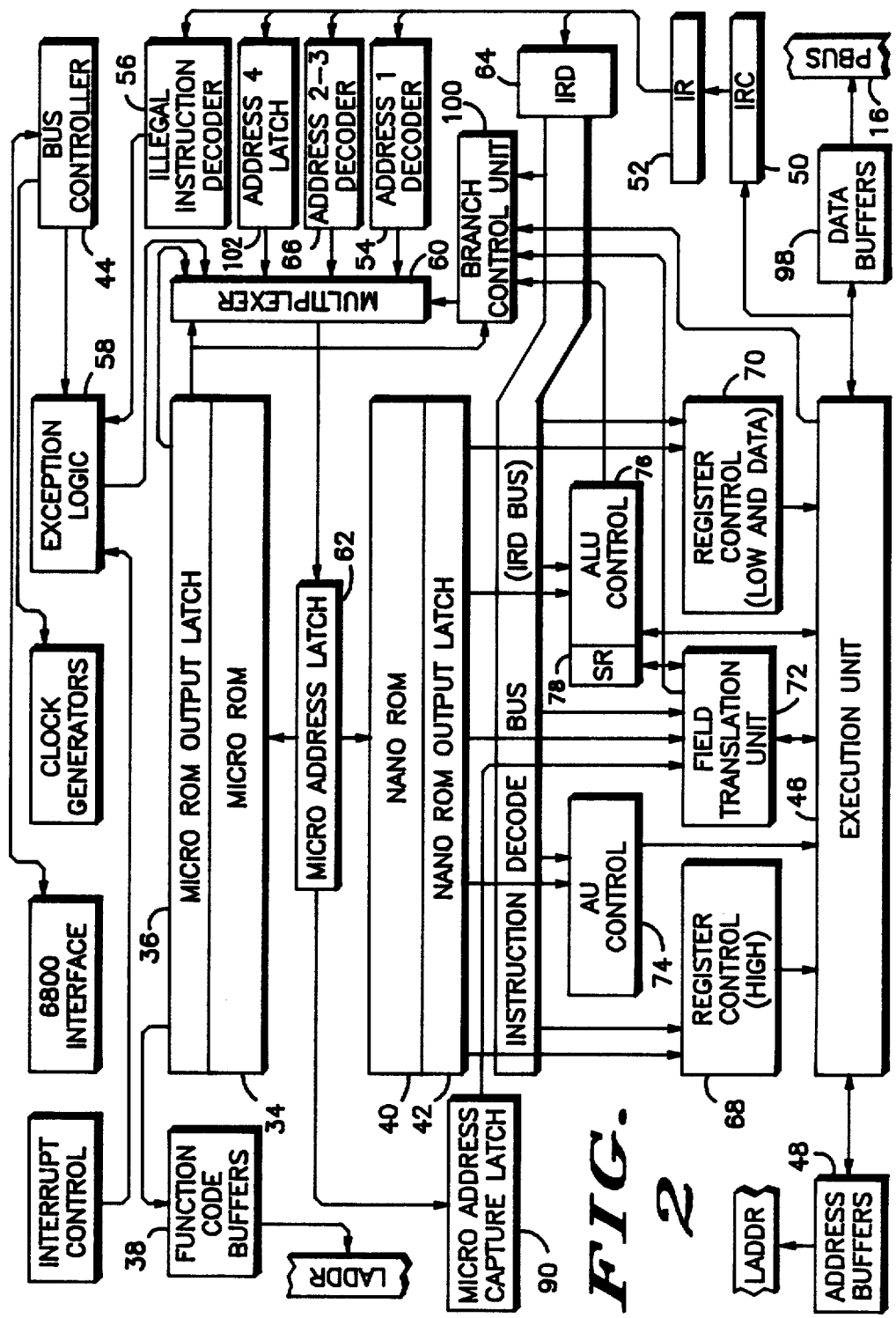
FIG. 2 is a block diagram of the data processor of FIG. 1.

The preferred operation of DP 12 will be described with reference to FIG. 2 which illustrates the internal organization of a microprogrammable embodiment of DP 12. Since the illustrated form of DP 12 is very similar to the Motorola MC68000 microprocessor described in detail in the several U.S. Patents cited hereafter, the common operation aspects will be described rather broadly. Once a general understanding of the internal architecture of DP 12 is established, the discussion will focus on the unique cache disable feature of the present invention.

The DP 12, like the MC68000, is a pipelined, microprogrammed data processor. In a pipelined processor, each instruction is typically fetched during the execution of the preceding instruction, and the interpretation of the fetched instruction usually begins before the end of the preceding instruction. In a microprogrammed data processor, each instruction is typically fetched during the execution of the preceding instruction, and the interpretation of the fetched instruction usually begins before the end of the preceding instruction. In a microprogrammed data processor, each instruction is executed as a sequence of microinstructions which perform small pieces of the operation defined by the instruction. If desired, user instructions may be thought of as macroinstructions to avoid confusion with the microinstructions. In the MC68000 and DP 12, each microinstruction comprises a microword which controls microinstruction sequencing and function code generation, and a corresponding nanoword which controls the actual routing of information between functional units and the actuation of special function units within DP 12. With this in mind, a typical instruction execution cycle will be described.

At an appropriate time during the execution of each instruction, a prefetch microinstruction will be executed. The microword portion thereof will, upon being loaded from micro ROM 34 into micro ROM output latch 36, enable function code buffers 38 to output a function code (FC) portion of the logical address (LADDR) indicating an instruction cycle. Upon being simultaneously loaded from nano ROM 40 into nano ROM output latch 42, the corresponding nanoword requests bus controller 44 to perform an instruction fetch bus cycle, and instructs execution unit 46 to provide the logical address of the first word of the next instruction to address buffers 48. Upon obtaining control of the PBUS 16, bus controller 44 will enable address buffers 48 to output the address portion of the logical address (LADDR). Shortly thereafter, bus controller 44 will provide appropriate data strobes (some of the LCNTL signals) to activate memory 20. When the memory 20 has provided the requested information, bus controller 44 enables instruction register capture (IRC) 50 to input the first word of the next instruction from PBUS 16. At a later point in the execution of the current instruction, another microinstruction will be executed to transfer the first word of the next instruction from IRC 50 into instruction register (IR) 52, and to load the next word from memory 20 into IRC 50. Depending upon the type of instruction in IR 52, the word in IRC 50 may be immediate data, the address of an operand, or the first word of a subsequent instruction. Details of the instruction set and the microinstruction sequences thereof are set forth fully in U.S. Pat. No. 4,325,121 entitled "Two Level Control Store for Microprogrammed Data Processor" issued Apr. 13, 1982 to Gunter et al, and which is hereby incorporated by reference.

As soon as the first word of the next instruction has been loaded into IR 52, address 1 decoder 54 begins decoding certain control fields in the instruction to determine the micro address of the first microinstruction in the initial microsequence of the particular instruction in IR 52. Simultaneously, illegal instruction decoder 56 will begin examining the format of the instruction in IR 52. If the format is determined to be incorrect, illegal instruction decoder 56 will provide the micro address of the first microinstruction of an illegal instruction microsequence. In response to the format error, exception logic 58 will force multiplexor 60 to substitute the micro address provided by illegal instruction decoder 56 for the micro address provide by address 1 decoder 54. Thus, upon execution of the last microinstruction of the currently executing instruction, the microword portion thereof may enable multiplexor 60 to provide an appropriate micro address to micro address latch 62, while the nanoword portion thereof enables instruction register decoder (IRD) 64 to load the first word of the next instruction from IR 52. Upon the selected micro address being loaded into micro address latch 62, micro ROM 34 will output a respective microword to micro ROM output latch 36 and nano ROM 40 will output a corresponding nanoword to nano ROM output latch 42.

Generally, a portion of each microword which is loaded into micro ROM output latch 36 specifies the micro address of the next microinstruction to be executed, while another portion determines which of the alternative micro addresses will be selected by multiplexor 60 for input to micro address latch 62. In certain instructions, more than one microsequence must be executed to accomplish the specified operation. These tasks, such as indirect address resolution, are generally specified using additional control fields within the instruction. The micro addresses of the first microinstructions for these additional microsequences are developed by address 2/3 decoder 66 using control information in IR 52. In the simpler form of such instructions, the first microsequence will typically perform some preparatory task and then enable multiplexor 60 to select the micro address of the microsequence which will perform the actual operation as developed by the address 3 portion of address 2/3 decoder 66. In more complex forms of such instructions, the first microsequence will perform the first preparatory task and then will enable multiplexor 60 to select the micro address of the next preparatory microsequence as developed by the address 2 portion of address 2/3 decoder 66. Upon performing this additional preparatory task, the second microsequence then enables multiplexor 60 to select the micro address of the microsequence which will perform the actual operation as developed by the address 3 portion of address 2/3 decoder 66. In any event, the last microinstruction in the last microsequence of each instruction will enable multiplexor 60 to select the micro address of the first microinstruction of the next instruction as developed by address 1 decoder 54. In this manner, execution of each instruction will process through an appropriate sequence of microinstructions. A more thorough explanation of the micro address sequence selection mechanism is given in U.S. Pat. No. 4,342,078 entitled "Instruction Register Sequence Decoder for Microprogrammed Data Processor" issued July 27, 1982 to Tredennick et al, and which is hereby incorporated by reference.

In contrast to the microwords, the nanowords which are loaded into nano ROM output latch 42 indirectly control the routing of operands into and, if necessary, between the several registers in the execution unit 46 by exercising control over register control (high) 68 and register control (low and data) 70. In certain circumstances, the nanoword enables field translation unit 72 to extract particular bit fields from the instruction in IRD 64 for input to the execution unit 46. The nanowords also indirectly control effective address calculations and actual operand calculations within the execution unit 46 by exercising control over AU control 74 and ALU control 76. In appropriate circumstances, the nanowords enable ALU control 76 to store into status register (SR) 78 the condition codes which result from each operand calculation by execution unit 46. A more detailed explanation of ALU control 76 is given in U.S. Pat. No. 4,312,034 entitled "ALU and Condition Code Control Unit for Data Processor" issued January 19, 1982 to Gunter, et al, and which is hereby incorporated by reference.

Figure 3:
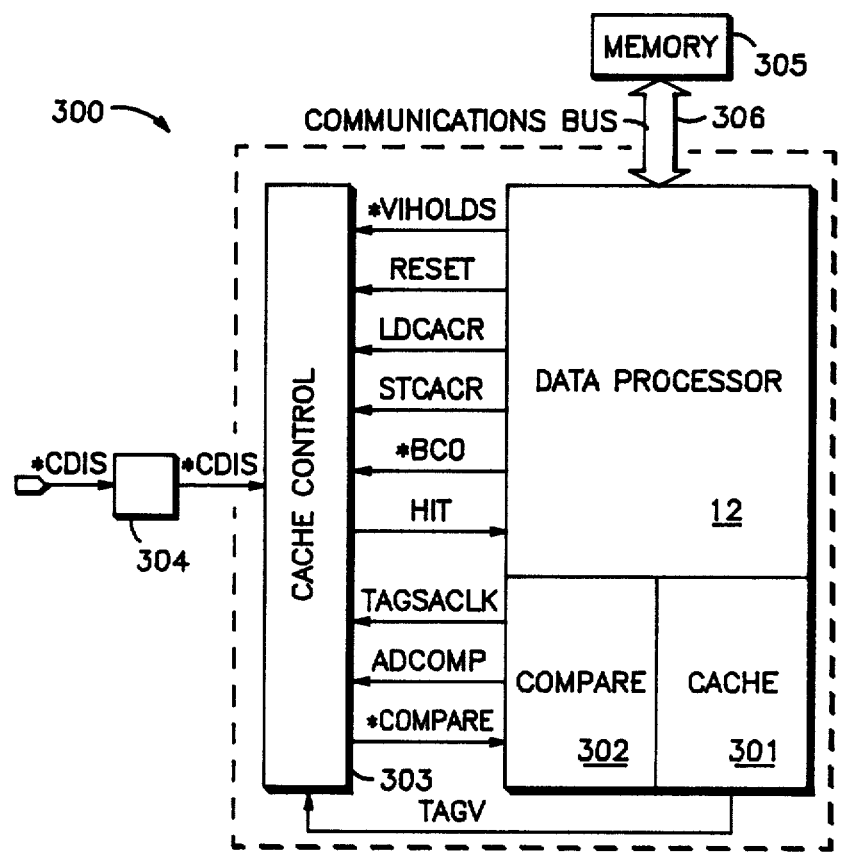
FIG. 3 is a block diagram of a data processing system with a cache according to a preferred embodiment of the invention.

Shown in FIG. 3 is an integrated circuit data processor system 300 with a cache function enclosed in dotted lines comprised of DP 12, a cache 301, a compare circuit 302, a cache control circuit 303. An external pin 304 for receiving a cache disable signal *CDIS is also shown in FIG. 3. Pin 304 is shown outside the dotted lines to show that signal *CDIS is generated externally from data processor system 300. An asterisk (*) indicates the signal function is active when the signal is a logic low. In this case when signal *CDIS is a logic low, the cache function is disabled. Pin 304 is directly connected to cache control circuit 303 of integrated circuit data processor 300 which receives signal *CDIS. A memory 305 is also external to integrated circuit data processor system 300 and is coupled thereto by a communication bus 306. Of course many other external pins (not shown) are connected to integrated circuit data processor 300. Cache control circuit 303 provides a hit signal HIT at a logic high when DP 12 can utilize cache 301.

Data processor system 300 uses cache 301 to store frequently used items of operating information normally called instructions. Each instruction has a memory location defined by an address. This address acts as a request signal for the particular instruction. A portion of cache 301 stores these addresses of the instructions which are stored in cache 301. The address storage portion of a cache, such as cache 301, is frequently called TAG cache and the addresses stored therein are called TAGs. DP 12 generates an address for an instruction which compare circuit 12 compares to addresses (or TAGs) stored in cache 301. This comparison will be valid only if cache control circuit 303 generates a compare signal *COMPARE at a logic low. If compare circuit 302 does not detect that the addresses are different (a miss), then an addresses compare signal ADCOMP is generated at a logic high. Cache 301 will generate a TAG valid signal TAGV if the compared address is valid. It is possible for the address generated by DP 12 to match an address in cache 301 which was placed in cache 301 at a start-up operation and not incidental to writing an instruction into cache 301. Consequently, it is necessary to verify that the compared address has in fact a valid corresponding instruction in cache 301. That there is a valid corresponding instruction is communicated by signal TAGV at a logic high. A signal TAGSACLK is a clock signal for synchronizing the comparison of the TAGs and the address of the instruction. Signal *COMPARE cannot be generated until signal TAGSACLK switches to a logic high.

Another signal, valid instruction holding state signal *VIHOLDS, also can prevent signal *COMPARE from being generated. DP 12 generates signal *VIHOLDS at a logic high during an access. Because such access may be to cache 301, it is desirable to prevent cache 301 from being disabled by signal *CDIS when signal *VIHOLDS is a logic high. Consequently, cache control 303 prevents both signal *COMPARE and signal HIT from responding to signal *CDIS when signal *VIHOLDS is a logic high.

DP 12 itself may or may not be in a mode where cache 301 is to be utilized. This information is communicated by a load cache register signal LDCACR, a state of cache register signal STCACR, and a least significant bit *BCO from an information bus (not shown except bit *BCO). DP 12 also provides a reset signal RESET which brings cache control circuit 303 to an initialized state. In the initialized state cache 301 is not to be utilized. The cache utilization state is communicated to cache control circuit 303 by DP 12 by providing signal LDCACR at a logic high and selecting bit *BCO to be the logic state which corresponds to the cache utilization state of DP 12. A logic high corresponds to not being in the cache utilization state, whereas a logic low corresponds to being in the cache utilization state. Cache control circuit 303 will store this information until DP 12 changes it. DP 12 can read the state of stored bit *BCO by providing signal STCACR at a logic high which will cause control circuit 303 to output bit *BCO at the stored state thereof. Bit *BCO at a logic low means that the cache utilization state is present whereas bit *BCO at a logic high means that the cache utilization state is not present and cache 301 is not to be utilized. An occurrence of signal RESET at a logic high indicates that DP 12 is being initialized and is therefore not to be in the cache utilization state. Cache control circuit 303, consequently responds to signal RESET at a logic high by forcing stored bit *BCO to a logic high. Whenever DP 12 is not in the cache utilization state as indicated by stored bit *BCO in cache control circuit 303, signal HIT is provided by cache control circuit 303 at a logic low. The effect of signal HIT being a logic low is that the addressed instruction must be accessed externally from data processing system 300 to memory 305 via communication bus 306. If signal HIT is a logic high, then cache 301 provides the requested instruction, and memory 305 does not receive the address for the requested instruction. Consequently, cache control circuit 303 has the effect of preventing communication bus 306 from carrying the address for the requested instruction when cache 301 provides the requested instruction.

An external access to memory 305 is required under any of the following five conditions; when system 300 is reset by signal RESET at a logic high, when DP 12 has set stored bit *BCO to a logic high, when the cache address and the address of the instruction do not match as indicated by signal ADCOMP being a logic low, when the TAG does not have a properly corresponding instruction in cache 301 as indicated by TAGV being a logic low, or when externally provided signal *CDIS is a logic low. A user of system 300 can prevent DP 12 from accessing cache 301 while maintaining normal operation by either software or hardware means, and thereby offering flexibility not previously seen in the art. Using software techniques, the user can cause DP 12 to store bit *BCO at a logic high in cache control 303 or can externally provide signal *CDIS at a logic low at pin 304. Either of these conditions will cause signal HIT to be a logic low, thereby causing DP 12 to make an instruction access which is external to system 300, and thereby making such instruction access readable by a user of system 300.

Figure 4A:
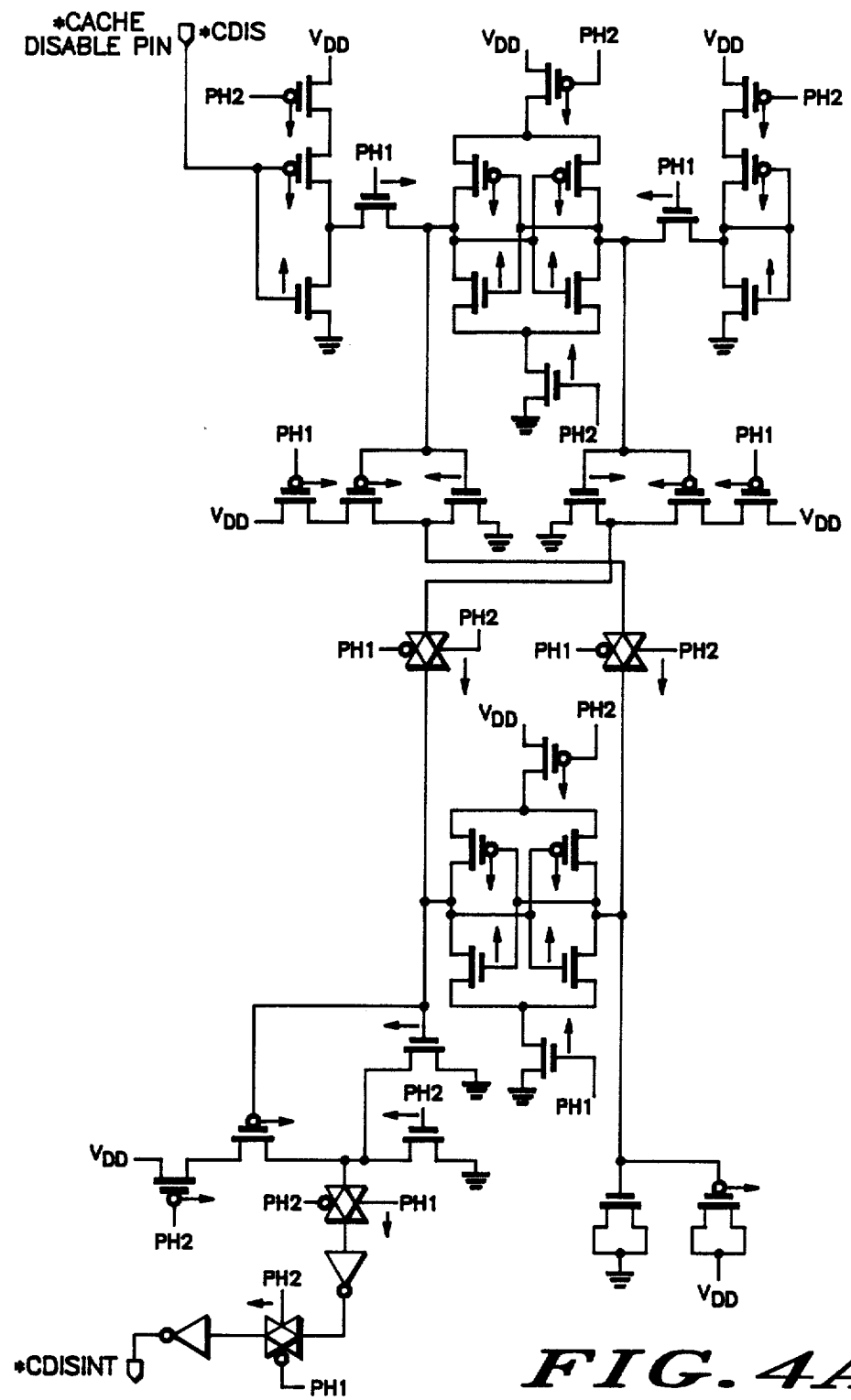
FIG. 4 comprises 4A and 4B is a combination logic and circuit diagram of a portion of the data processing system of FIG. 3 useful for implementing the invention.
Figure 4B:
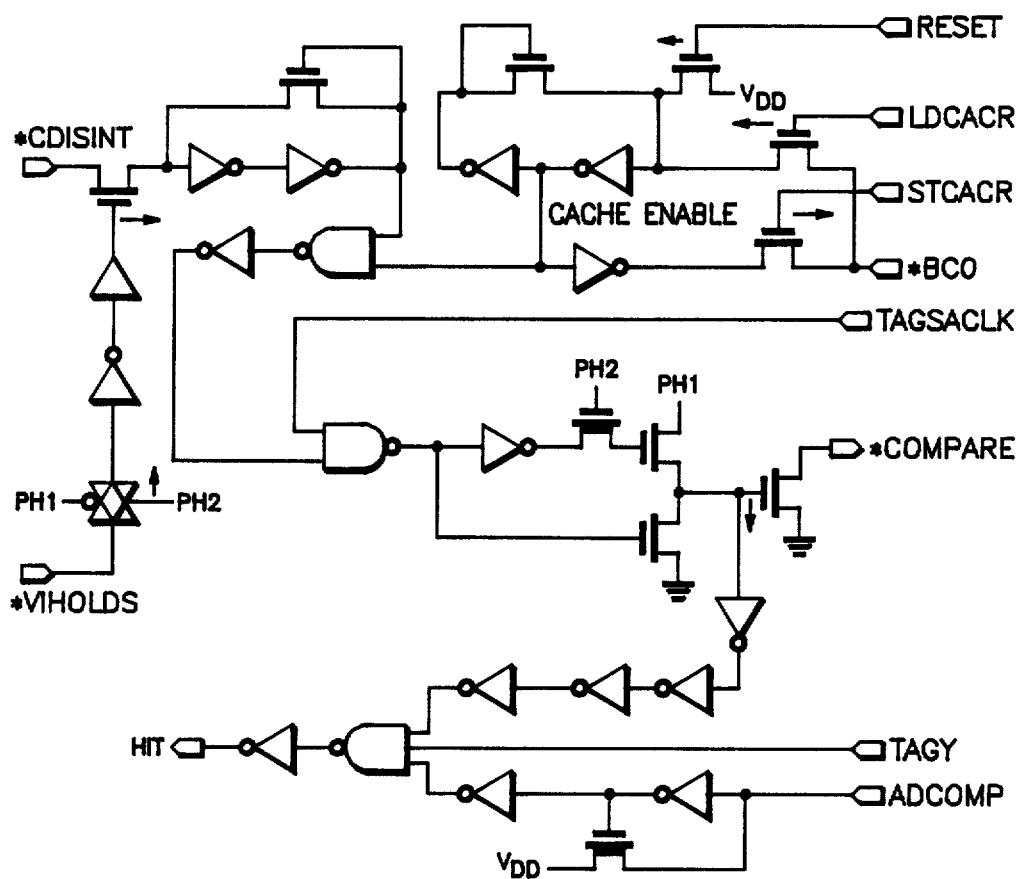

Shown in FIGS. 4A and 4B is a combination logic and circuit diagram of a circuit which can be used for implementing cache control 303.

We claim:

1. A data processing system comprising:
a main memory for storing a plurality of instructions;
a processor for executing the instructions, the processor providing a first cache disable signal in response to executing a predetermined one of the instructions;
a cache memory for temporarily storing a selected subset of the instructions executed by the processor;
cache disable means for disabling the cache memory in response to the first cache disable signal provided by the processor;
first means in the cache disable means for receiving a second cache disable signal from a source external to said data processing system;
second means in the cache disable means for disabling the cache memory in response to the second cache disable signal received by the first means;
third means in the cache disable means for disabling said second means in response to a control signal provided by the processor while the processor is accessing the cache memory.

* * * * *